Patented Apr. 1, 1930

1,752,853

UNITED STATES PATENT OFFICE

ARTHUR RUSSELL, OF BALTIMORE, MARYLAND, AND JOSEPH F. HEGEMAN, OF NEW YORK, N. Y.

PROCESS FOR PRODUCING CELLULOSE ACETATE

No Drawing. Application filed February 15, 1929. Serial No. 340,180.

This invention relates to the production of cellulose acetate and has special reference to the production of cellulose acetate in a rapid manner while, at the same time, preserving the property of checking the formation of the compound at the desired point in curing.

In the usual production of cellulose acetate under the method now known it requires approximately eight hours to complete the reaction resultant from the treatment of cellulose by the acetylizing reagent. One object of the present invention is to provide a process whereby the time of acetylization may be reduced to between two and three hours.

Again, in the production of cellulose acetate it is necessary to allow the mass, during the final stages of its production, to ripen for from three to five or even seven days. A second important object of the invention is to provide an improved process of producing cellulose acetate wherein the ripening may be effected in from twelve to sixty hours according to the type of product desired.

One manner of carrying out the process will now be described. A sufficient quantity of dry cellulose, containing not over 5 to 6% moisture, is taken as the basis of the mass to be formed. This cellulose may be of any preferred type. For instance, cotton linters are found to be an excellent source of cellulose for carrying out the process. The quantity of cellulose taken is regarded as unity and with this is mixed from 2 to 2.8 parts of acetic anhydride, 5 to 20% of sulphuric acid and 3 to 5 parts of acetic acid as a diluent. The cellulose is first charged in a reaction vessel of any suitable type arranged so that the charge may be stirred and we have shown a suitable vessel for this purpose in our copending application executed of even date herewith. The reaction mixture consisting of the acetic anhydride and acids is cooled to minus 5° C. and is then run into the reaction vessel which is then hermetically closed. Pressure is then applied to the mass, preferably by means of compressed air, so that the pressure within the vessel is brought up to 50 to 75 pounds per square inch. This ensures rapid impregnation of the cellulose by the reaction mixture. The mass is then agitated by the stirrers for thirty minutes under such pressure while the temperature is maintained at minus 5° C. At the end of the thirty minutes the temperature of the mass is gradually raised at a rate of approximately 15° C. per hour over a period of three hours so that, at the end of this time, the mass has reached a temperature of 40° C.

Tests are now made by withdrawing samples from time to time and examining these samples both for solution and under the microscope for uniformity. When the mass has reached the stage in which the cellulose acetate is soluble in chloroform a hydration mixture is added and this mixture is made as follows. Enough water is taken to react with the excess acetic anhydride and to this sufficient water is added to dilute the acetic acid diluent to between 50 and 95%. To the water is further added sulphuric acid in a proportion equal to from 5 to 20% of the weight of the original quantity of cellulose. This mixture is added slowly and stirred into the mass. When it has all been added the pressure is raised to between 100 and 200 pounds per square inch, the temperature being kept at 40° C. or, if it has fallen, being again raised to 40° C. After the entire mass is mixed it is allowed to ripen under the last mentioned pressure while the temperature is maintained evenly. The period of ripening depends on the type of product desired and the use to be made thereof. This ripening period runs from twenty-four to sixty hours and the products produced, having relation to their solubility, are in the following order in time of ripening:—chloroform soluble, alcohol-chloroform soluble, acetone soluble, ethyl acetate-alcohol soluble.

The condition of the product may be ascertained from time to time by tests taken in the usual manner.

It is found that this process produces complete acetylization in much less time than the ordinary process, that the product is evener in its character and that the ripening can be effected to the highest degree in less time than it usually takes to produce the chloroform soluble cellulose acetate, this being the earliest stage or type of cellulose acetate.

Having thus described the invention, what is claimed as new, is:

1. Those steps in the process of producing cellulose acetate which consist in mixing cellulose with an acetylizing solution and acetylizing the cellulose under pressure of between 50 and 75 pounds per square inch, and adding a hydration mixture and raising the pressure while maintaining the temperature.

2. Those steps in the process of producing cellulose acetate which consist in mixing cellulose with an acetylizing solution and acetylizing the cellulose under pressure of between 50 to 75 pounds per square inch and gradually raising the temperature of the mass during the treatment, and adding a hydration mixture and raising the pressure while maintaining the temperature.

3. Those steps in the process of producing cellulose acetate which consist in mixing cellulose with an acetylizing solution and acetylizing the cellulose under pressure of between 50 to 75 pounds per square inch and gradually raising the temperature of the mass during the treatment to approximately 40° C., and adding a hydration mixture and raising the pressure while maintaining the temperature.

4. Those steps in the process of producing cellulose acetate which consist in mixing cellulose with an acetylizing solution and acetylizing the cellulose under pressure of between 50 and 75 pounds per square inch, and adding a hydration mixture and raising the pressure to between 100 and 200 pounds per square inch while maintaining the temperature.

5. Those steps in the process of producing cellulose acetate which consist in mixing cellulose with an acetylizing solution and acetylizing the cellulose under pressure of between 50 to 75 pounds per square inch and gradually raising the temperature of the mass during the treatment, and adding a hydration mixture and raising the pressure to between 100 and 200 pounds per square inch while maintaining the temperature.

6. Those steps in the process of producing cellulose acetate which consist in mixing cellulose with an acetylizing solution and acetylizing the cellulose under pressure of between 50 to 75 pounds per square inch and gradually raising the temperature of the mass during the treatment to approximately 40° C., and adding a hydration mixture and raising the pressure to between 100 and 200 pounds per square inch while maintaining the temperature.

In testimony whereof we affix our signatures.

ARTHUR RUSSELL.
JOSEPH F. HEGEMAN.